United States Patent
Farmanbar

(10) Patent No.: US 9,722,913 B2
(45) Date of Patent: Aug. 1, 2017

(54) SYSTEM AND METHOD FOR DELAY MANAGEMENT FOR TRAFFIC ENGINEERING

(71) Applicant: Huawei Technologies Co., Ltd., Shenzhen (CN)

(72) Inventor: Hamidreza Farmanbar, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 14/533,797

(22) Filed: Nov. 5, 2014

(65) Prior Publication Data

US 2015/0124636 A1 May 7, 2015

Related U.S. Application Data

(60) Provisional application No. 61/900,205, filed on Nov. 5, 2013.

(51) Int. Cl.
  *H04L 12/50* (2006.01)
  *H04L 12/727* (2013.01)
  *H04L 12/721* (2013.01)
  *H04L 12/725* (2013.01)

(52) U.S. Cl.
  CPC ............ *H04L 45/121* (2013.01); *H04L 45/30* (2013.01); *H04L 45/38* (2013.01)

(58) Field of Classification Search
  CPC .................................................... H04L 45/121
  USPC ......................................................... 370/339
  See application file for complete search history.

(56) References Cited

U.S. PATENT DOCUMENTS

| | | | |
|---|---|---|---|
| 2005/0288888 A1 | 12/2005 | Ye et al. | |
| 2009/0059793 A1 | 3/2009 | Greenberg | |
| 2010/0202297 A1 | 8/2010 | Liu et al. | |
| 2010/0278069 A1* | 11/2010 | Sharma | H04L 45/02 370/254 |
| 2012/0230185 A1 | 9/2012 | Yong | |
| 2013/0182561 A1 | 7/2013 | Xu et al. | |

OTHER PUBLICATIONS

Agarwal, R., et al., "Joint Rate Allocation and Routing for Multihop Wireless Networks with Delay-Constrained Data," citeseerx.ist.psu.edu/viewdoc/summary?doi=10.1.1.217.3882, received Nov. 5, 2014, 4 pages.

Setton, E., et al., "Congestion-optimized multi-path streaming of video over ad hoc wireless networks," IEEE International Conference Multimedia and Expo, vol. 3, Jun. 27-30, 2004, pp. 1619-1622.

Ashwini, J. P., "Delay Constrained Communication Using Traffic Engineering in Best Effort Network," Roll No. 07305301, Department of Science and Engineering, Jun. 25, 2009, 32 pages.

International Search Report of Patent Cooperation Treaty (PCT), Application No. PCT/US14/64115, date of mailing Mar. 31, 2015, 11 pages.

* cited by examiner

*Primary Examiner* — Dang Ton

(74) *Attorney, Agent, or Firm* — Slater Matsil, LLP

(57) ABSTRACT

A method for engineering traffic in a communications system includes determining a set of delay constraints associated with a traffic flow over the communications system, and excluding non-convex constraints from the set of delay constraints, thereby producing a set of convex constraints. The method also includes selecting a path solution for the traffic flow in accordance with the set of convex constraints, and sending information regarding the path solution to nodes in the communications system.

28 Claims, 12 Drawing Sheets

SYSTEM AND METHOD FOR DELAY MANAGEMENT FOR TRAFFIC ENGINEERING

This application claims the benefit of U.S. Provisional Application No. 61/900,205, filed on Nov. 5, 2013, entitled "System and Method for Delay Management for Traffic Engineering," which application is hereby incorporated herein by reference.

TECHNICAL FIELD

The present disclosure relates generally to digital communications, and more particularly to a system and method for delay management for traffic engineering (TE).

BACKGROUND

Traffic engineering (TE) offers a number of different features and services in network planning, including the possibility of higher achievable network capacity through multi-path routing and smart traffic splitting among multiple paths. Multiple path possibilities for a traffic flow benefits networking in terms of achieving certain objectives such as higher throughput, better load balancing, and the like. However, multiple path possibilities for traffic flows may increase delay.

SUMMARY OF THE DISCLOSURE

Example embodiments of the present disclosure which provide a system and method for delay management for traffic engineering.

In accordance with an example embodiment of the present disclosure, a method for engineering traffic in a communications system is provided. The method includes determining, by a traffic engineering (TE) controller, a set of delay constraints associated with a traffic flow over the communications system, and excluding, by the TE controller, non-convex constraints from the set of delay constraints, thereby producing a set of convex constraints. The method also includes selecting, by the TE controller, a path solution for the traffic flow in accordance with the set of convex constraints, and sending, by the TE controller, information regarding the path solution to nodes in the communications system.

In accordance with another example embodiment of the present disclosure, a method for engineering traffic in a communications system is provided. The method includes determining, by a traffic engineering (TE) controller, a set of candidate paths for carrying a traffic flow over the communications system and a set of link capacity constraints for the communications system, wherein the traffic flow has an associated set of flow demand constraints, and selecting, by the TE controller, a path solution for the traffic flow out of the set of candidate paths in accordance with the set of flow demand constraints, and the set of link capacity constraints. The method also includes storing, by the TE controller, the path solution, determining, by the TE controller, that a completion criterion is met, and sending, by the TE controller, information regarding the stored path solution to nodes in the communications system when the completion criterion is met.

In accordance with another example embodiment of the present disclosure, a traffic engineering (TE) controller of a communications system is provided. The TE controller includes a processor, and a transmitter operatively coupled to the processor. The processor determines a set of delay constraints associated with a traffic flow over the communications system, excludes non-convex constraints from the set of delay constraints, thereby producing a set of convex constraints, and selects a path solution for the traffic flow in accordance with the set of convex constraints. The transmitter sends information regarding the path solution to nodes in the communications system.

In accordance with another example embodiment of the present disclosure, a traffic engineering (TE) controller of a communications system is provided. The TE controller includes a processor, and a transmitter operatively coupled to the processor. The processor determines a set of candidate paths for carrying a traffic flow over the communications system and a set of link capacity constraints for the communications system, wherein the traffic flow has an associated set of flow demand constraints, selects a path solution for the traffic flow out of the set of candidate paths in accordance with the set of flow demand constraints, and the set of link capacity constraints, stores the path solution, and determines that a completion criterion is met. The transmitter sends information regarding the stored path solution to nodes in the communications system when the completion criterion is met.

One advantage of an embodiment is that TE that considers delay constraints is provided. The consideration of delay constraints helps TE to meet quality of service (QoS) restrictions.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to delay management for traffic engineering. For example, a traffic engineering (TE) controller determines a set of delay constraints associated with a traffic flow over the communications system, and excludes non-convex constraints from the set of delay constraints, thereby producing a set of convex constraints. In general, a constraint may be said to be convex if for every pair of points in the constraint, every point on a straight line segment joining the pair of points is also within the constraint. A non-convex constraint is simply a constraint that is not a convex constraint. The TE controller also selects a path solution for the traffic flow in accordance with the set of convex constraints, and sends information regarding the path solution to nodes in the communications system.

The present disclosure will be described with respect to example embodiments in a specific context, namely communications systems that use TE with delay constraints to improve communications system performance. The disclosure may be applied to standards compliant communications systems, such as those that are compliant with Third Generation Partnership Project (3GPP), IEEE 802.11, and the like, technical standards, and non-standards compliant communications systems, that use TE with delay constraints to improve communications system performance.

Figure 1:
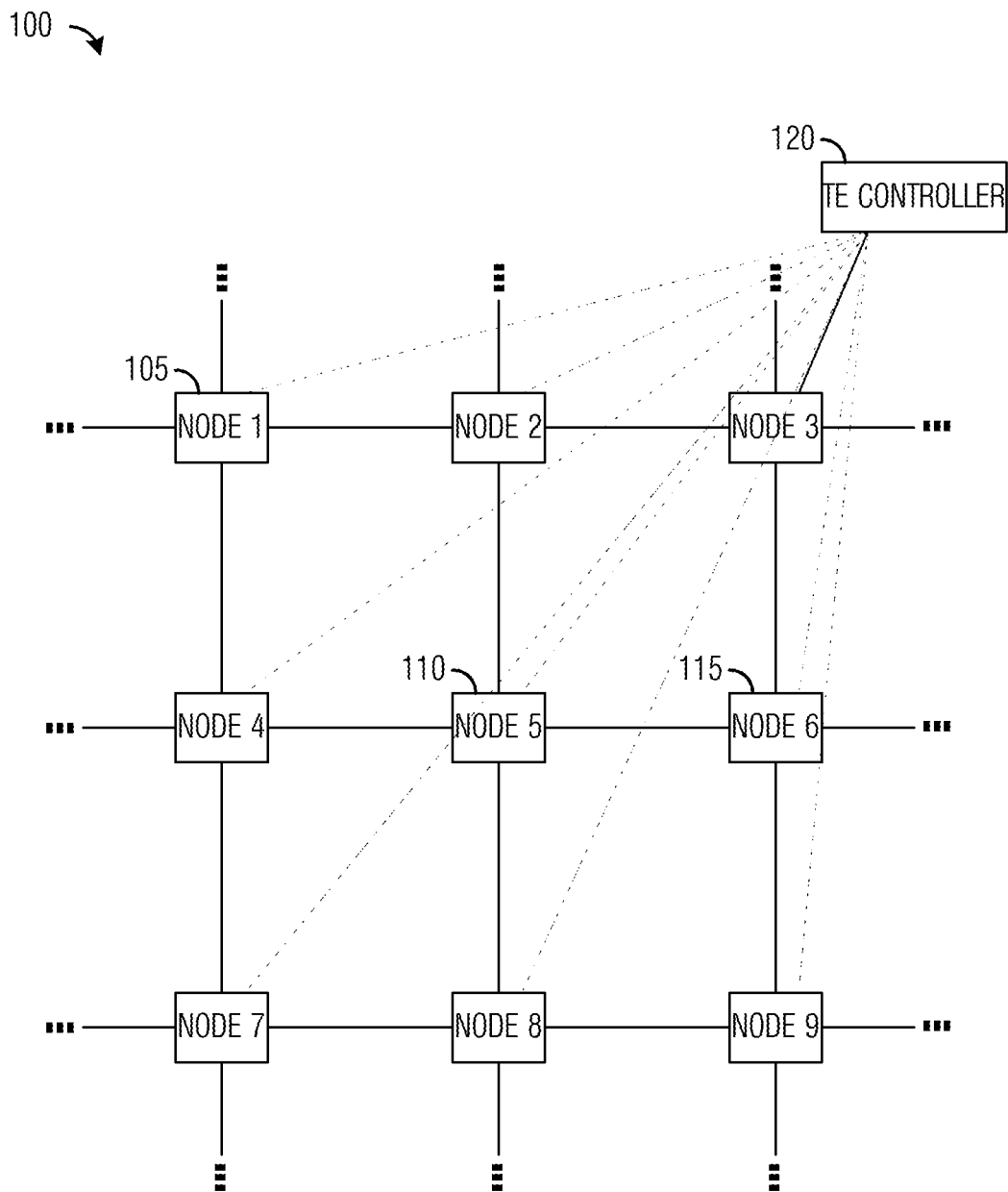
FIG. 1 illustrates an example communications system according to example embodiments described herein.

FIG. 1 illustrates an example communications system 100. Communications system 100 includes a plurality of nodes, such as node 105, node 110, and node 115. Some of the nodes may be directly connected, such as node 110 and node 115, while other nodes may be indirectly connected, such as node 105 and node 115. Communications system 100 may have a regular topology meaning that each node has the same arrangement of connections. As shown in FIG. 1, communications system 100 has a grid-like topology with each node having 4 connections. Alternatively, communications systems may have irregular topology where different nodes may have different arrangements of connections. As an example, in an example communications system with irregular topology, a first set of nodes may have a first number of connections, a second set of nodes may have a second number of connections, and so on. Additionally, communications system 100 is a flat system with all of the nodes being on a single level. Other communications systems may have a multi-level configuration with a first type of nodes on a first level, a second type of nodes on a second level, and so forth.

Communications system 100 may also include a TE controller 120. TE controller 120 may be configured to perform TE for communications system 100. TE controller 120 may be configured to consider delay constraints while performing TE. TE controller 120 may be a stand-alone device as shown in FIG. 1. Alternatively, TE controller 120 may be collocated in a node (such as one of those shown in FIG. 1) or in a network entity not shown in FIG. 1. Additionally, there may be a single TE controller 120 for the entirety of communications system 100. Alternatively, there may be a plurality of TE controllers, with each TE controller performing TE for a portion of communications system 100.

While it is understood that communications systems may employ multiple nodes capable of communicating with one another, only 9 nodes are illustrated for simplicity. Although the discussion focuses on a single communications system configuration, the example embodiments presented herein are operable with other communications system configurations. Therefore, the discussion of a single layer regular communications system should not be construed as being limiting to either the scope or the spirit of the example embodiments.

In general, TE can be used to offer higher achievable network capacity through multi-path routing (the use of more than one path to transmit a single traffic flow) and smart traffic splitting among the multiple paths. The potential to route a traffic flow over multiple paths may benefit the communications system in terms of achieving objectives such as higher throughput, load balancing, and the like. However, multiple paths may increase packet delay if delay is not considered in the TE process. TE processes typically have as constraints: flow demand, wireline link capacity, and wireless link resource capacity.

According to an example embodiment, in order to consider delay constraints in TE, end-to-end flow delay (for delay-sensitive traffic) as a function of path rate allocation is expressed. Packet delay of a link (wireline or wireless) depends upon packet arrival and packet transmission processes.

A model for packet delay in a single path scenario is as follows:

$\lambda$ is a mean arrival rate in packets per second; and $\mu$ is a mean link transmission rate in packets per second. In order to ensure queue stability, the relation $\lambda < \mu$ must be maintained. The packet delay may then be expressed as:

packet delay=queuing delay+transmission delay+ propagation delay+processing delay, where the propagation delay and the processing delay may be negligible due to their relative amounts and relative consistency.

Mean packet delay w may depend upon the nature of the packet arrival process and a packet transmission time probability distribution. For the model, no packet prioritization is used. Examples of packet arrival processes include Poisson and deterministic, while examples of packet transmission time processes include exponential and deterministic.

In a system with a M/M/1 queue with a Poisson arrival process with an exponential inter-arrival time (i.e., memoryless), and an exponential probability distribution for transmission time, the mean packet delay may be expressed as $$w = \frac{1}{\mu - \lambda}.$$

In a system with a M/G/1 queue with an exponential inter-arrival time (i.e., memoryless), and a general probability distribution for transmission time, the mean packet delay may be expressed as $$w = \frac{\lambda/\mu + \lambda\mu \text{var}(S)}{2(\mu - \lambda)} + \frac{1}{\mu}.$$

In a system with a M/D/1 queue with an exponential inter-arrival time (i.e., memoryless), and a deterministic transmission time, the mean packet delay may be expressed as $$w = \frac{2\mu - \lambda}{2\mu(\mu - \lambda)}.$$

In a system with a D/D/1 queue with a deterministic arrival process with fixed inter-arrival times, and a deterministic transmission time, the mean packet delay may be expressed as $$w = \frac{1}{\mu}.$$

Figure 2:
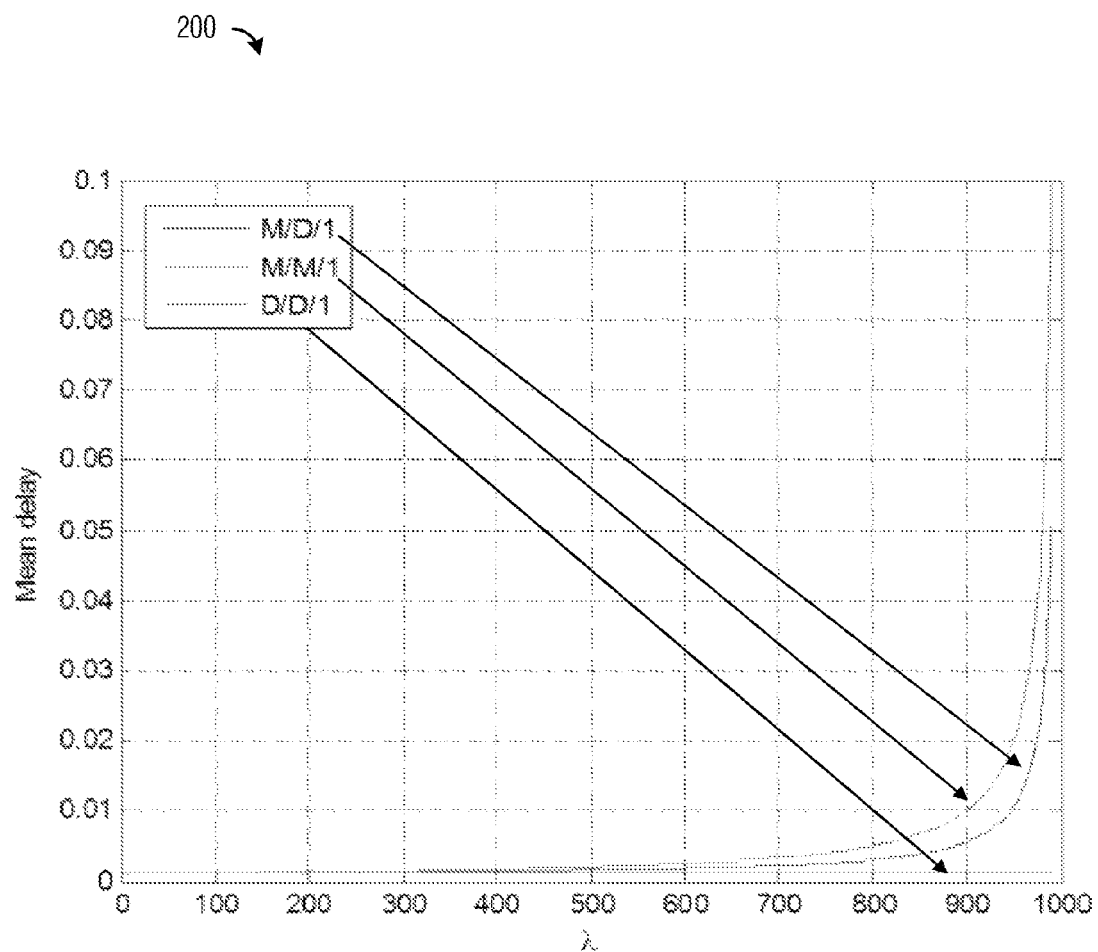
FIG. 2 illustrates an example data plot of mean packet delay on a single link for various mean arrival rates according to example embodiments described herein.

FIG. 2 illustrates a data plot 200 of mean packet delay on a single link for various mean arrival rates.

Figure 3:
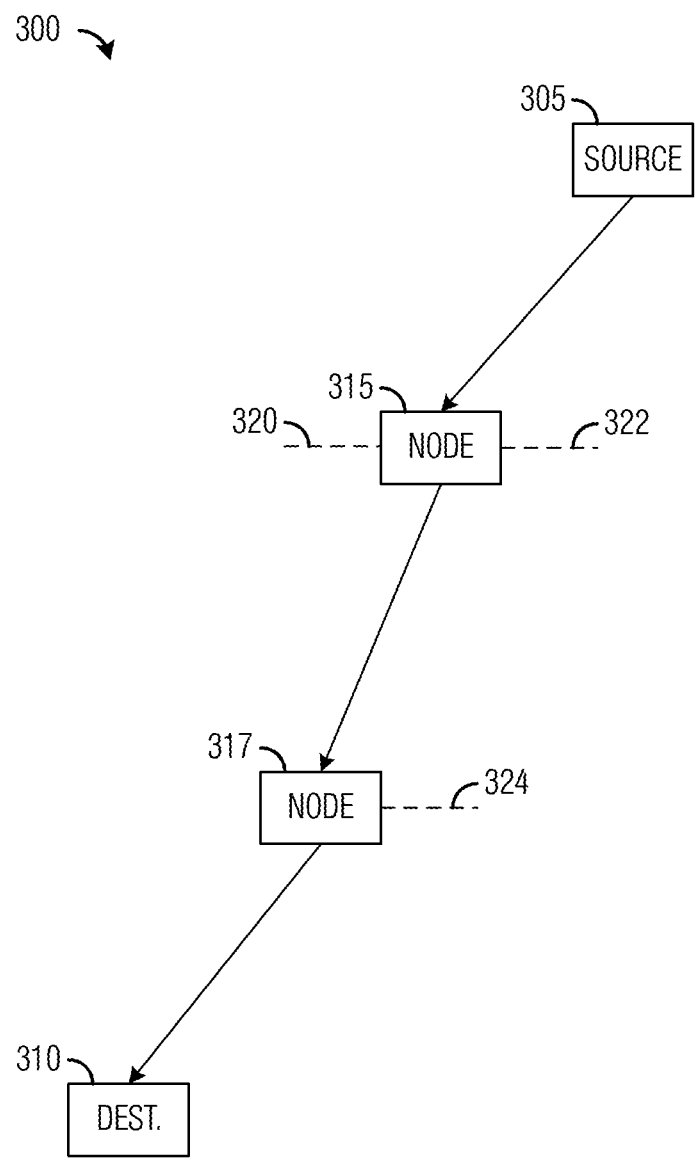
FIG. 3 illustrates a portion of an example communications system highlighting a path between a source 305 and a destination according to example embodiments described herein.

FIG. 3 illustrates a portion of an example communications system 300 highlighting a path between a source 305 and a destination 310. The path between source 305 and destination 310 may include a plurality of intermediate nodes, such as node 315 and node 317. With respect to end-to-end packet delay, in situations with tandem queues, the nature of the arrival process is not preserved from queue to queue since there are other links that merge into and/or depart from the intermediate nodes (such as link 320, 322, and 324). However, according to the Kleinrock Independence Approximation, merging several packet streams on a transmission line (a link) has an effect similar to restoring independence to the inter-arrival times.

According to an example embodiment, it is possible to utilize the Kleinrock Independence Approximation to determine the end-to-end mean packet delay for a path, such as shown in FIG. 3. Consider a situation where a flow k has candidate paths $p_1, \ldots, p_{1\_k}$, and $y_e^j$ is the allocation of flow j on link e, and $c_e$ is the capacity of link e in packets per second. The end-to-end packet delay on path p (assuming a M/M/1 queue) is expressible as $$\sum_{e:\ \text{arc on path } p} \frac{1}{c_e - \sum_j y_e^j}.$$

In general, a traffic flow between a source and a destination, such as from source 305 to destination 310, has an associated delay constraint. The delay constraint may be in a form as simple as a single time value, in milliseconds, for example. However, when considering multiple candidate paths for the traffic flow out of a set of candidate paths, every path in the set of candidate paths must also meet the delay constraint, thereby leading to a set of delay constraints. A similar situation also occurs with other constraints, such as link capacity constraints, flow demand constraints, and the like.

Figure 4:
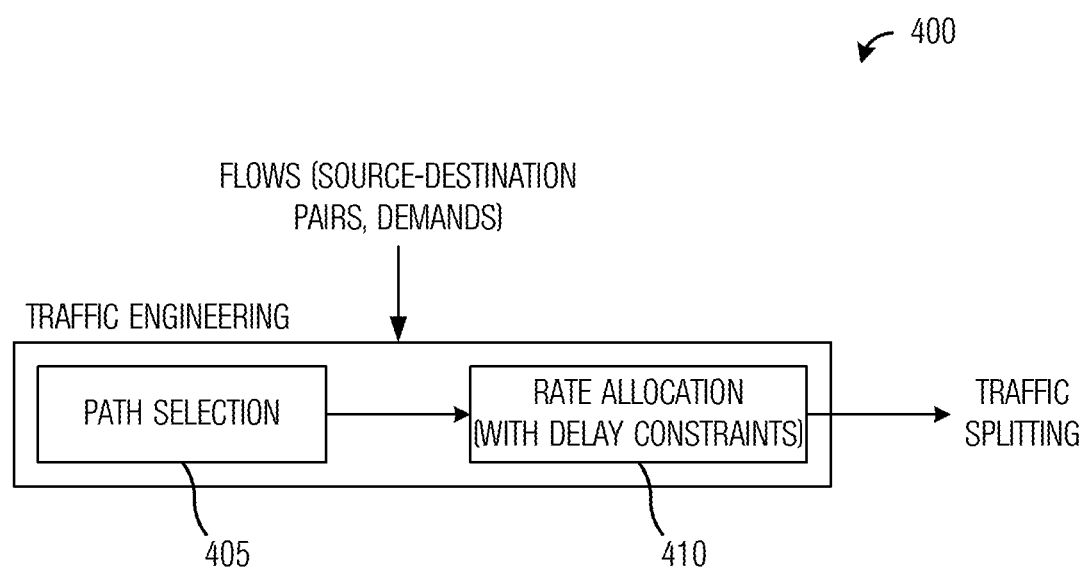
FIG. 4 illustrates an example TE controller according to example embodiments described herein.

FIG. 4 illustrates an example TE controller 400. TE controller 400 includes a path selection unit 405 configured to select one or more paths for traffic flows. TE controller 400 also includes a rate allocation unit 410 configured to allocate packet rates (i.e., bandwidth) for paths of the one or more paths for each traffic flow, i.e., each path solution of each traffic flow. Rate allocation unit 410 may also allocate fractions or percentage of each traffic flow to the one or more paths. Collectively, the one or more paths (result of path selection unit 405) and the allocated packet rates or percentages (result of rate allocation unit 410) may be referred to as a path solution.

According to an example embodiment, end-to-end delay constraints that are non-convex are relaxed to enable path elimination so that TE may be performed with delay guarantees ensured. The example embodiment is operable with general delay constraints.

Figure 5:
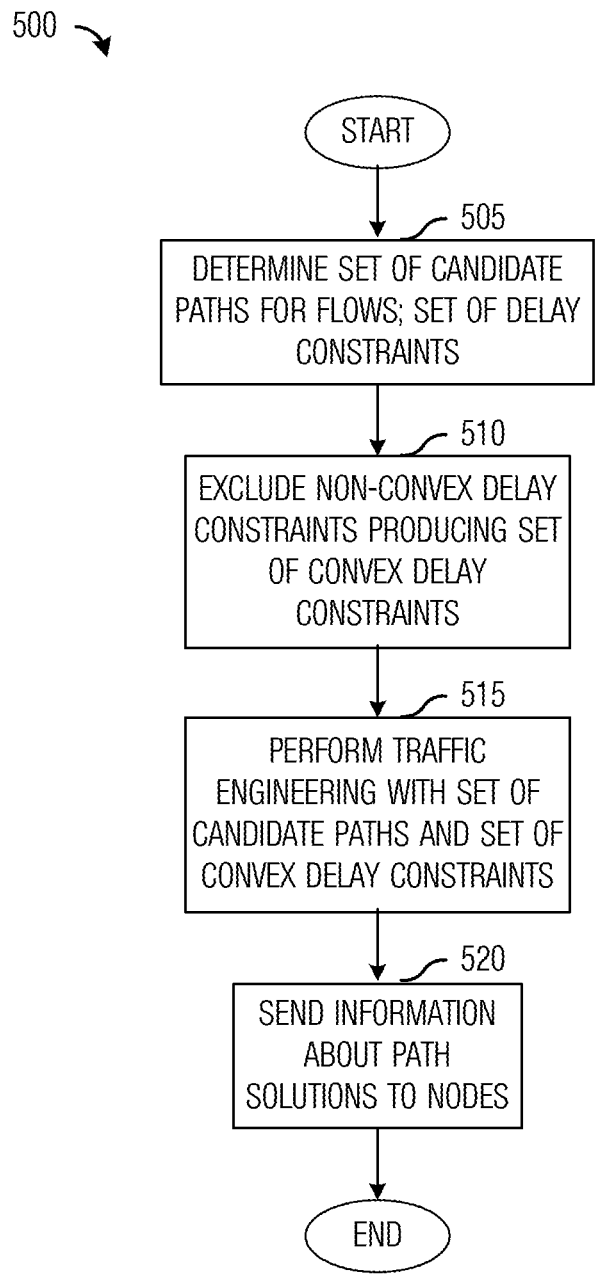
FIG. 5 illustrates a flow diagram of example operations occurring at a TE controller as the TE controller performs TE with consideration being given to delay constraints according to example embodiments described herein.

FIG. 5 illustrates a flow diagram of example operations 500 occurring at a TE controller as the TE controller performs TE with consideration being given to delay constraints. Operations 500 may be indicative of operations occurring in a TE controller, such as TE controller 120, as the TE controller performs TE with consideration being given to delay constraints.

Operations 500 may begin with the TE controller determining sets of candidate paths and sets of delay constraints for traffic flows upon which it is performing TE (block 505). In general, the sets of candidate paths may include all paths between a source and a destination for each traffic flow. In practice, the set of candidate paths may include paths that are shorter than a specified number of hops, paths that do not include links that are over loaded, and the like. The TE controller may identify and exclude non-convex delay constraints from the set of delay constraints, producing a set of convex delay constraints (block 510). The set of delay constraints may be associated with the set of candidate paths for traffic flows. There may be a set of delay constraints for each traffic flow. In general, a constraint may be said to be convex if for every pair of points in the constraint, every point on a straight line segment joining the pair of points is also within the constraint. A non-convex constraint is simply a constraint that is not a convex constraint.

The TE controller can then solve the TE problem subject to the set of convex delay constraints, as well as other constraints, producing path solutions (block 515). The TE controller may consider other constraints such as flow demand constraints, wireline link capacity constraints, wireless link resource capacity constraints, and the like. The TE controller, as a result of performing TE, may produce a path solution for each traffic flow. The path solutions may include one or more paths between a source and destination for each traffic flow. The path solutions may also include a rate or percentage or fraction of each traffic flow assigned to each of the paths in the path solution, if there is more than one path in the path solution. The TE controller may provide information about the path solutions to nodes, such as routers, in the communications system (block 520). The TE controller may send information about the path solutions to sources and/or destinations, for example. As another illustrative example, the TE controller may save information about the path solutions to a database that is accessible by nodes in the communications system and the nodes may retrieve information associated with their particular traffic flow.

In general, TE may consume a considerable amount of computational resources, especially when a large number of iterations are performed to find path solutions meeting constraints for all of the flows. As an illustrative example, if a number of constraints are excluded for being non-convex delay, a process of reconsidering them may be computationally intensive. A computationally intensive approach may add each path with non-convex constraint back for TE evaluation. However, if there are a large number of non-convex constraints, there will be a large number of subsequent TE evaluations. A less computationally intensive approach may be to add several paths with non-convex constraints per iterative TE evaluation. However, adding more than one such path may result in an increase in the number of potential TE evaluation iterations since different combinations of such paths are possible.

According to an example embodiment, delay constraints are considered at a different stage of the TE process from other constraints, such as flow demand constraints, wireline link capacity constraints, wireless link resource capacity constraints, and the like.

Figure 6:
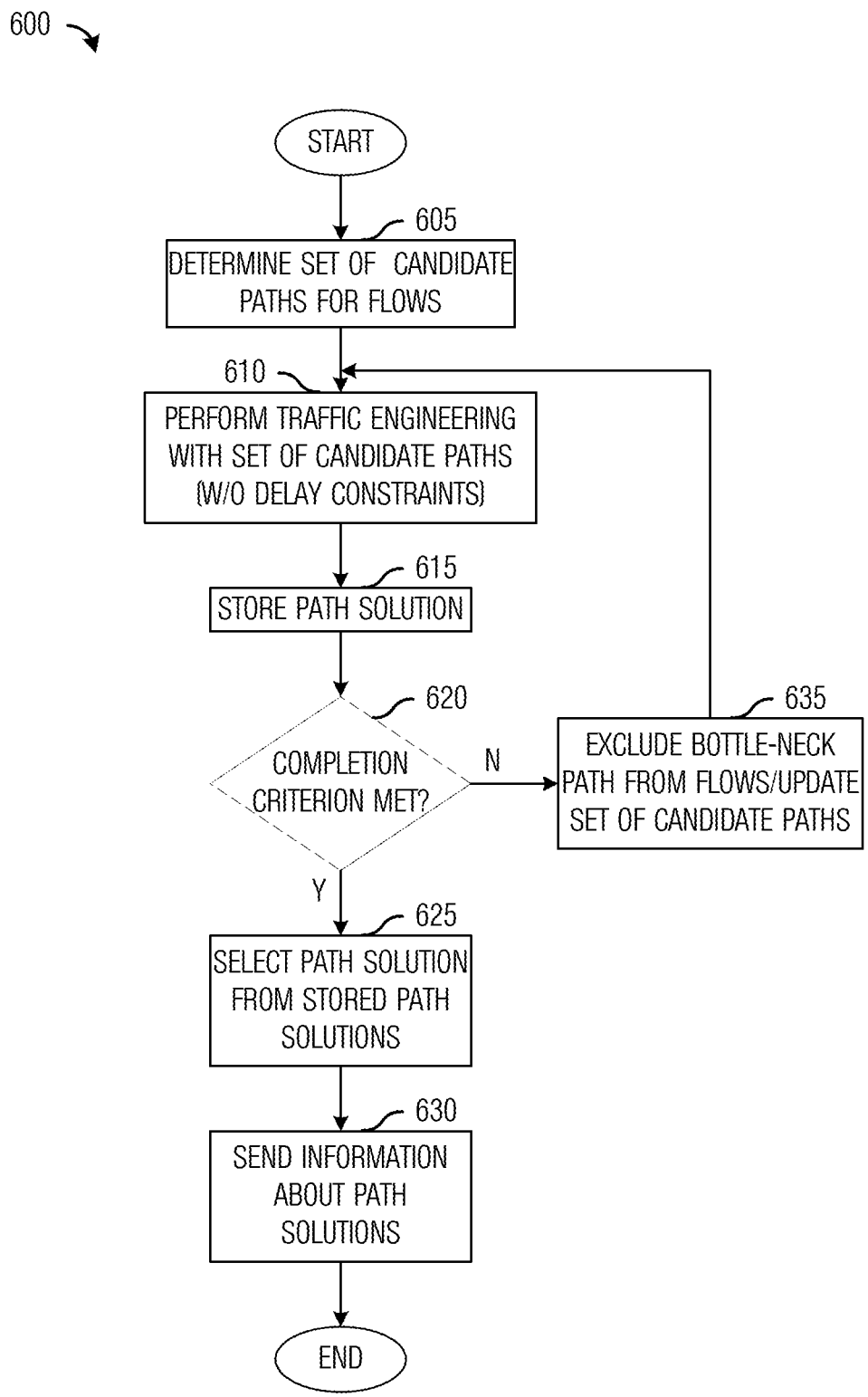
FIG. 6 illustrates a flow diagram of example operations occurring in a TE controller as the TE controller performs TE with consideration being given to delay constraints, with the delay constraints being considered at a different time from other constraints according to example embodiments described herein.

FIG. 6 illustrates a flow diagram of example operations 600 occurring in a TE controller as the TE controller performs TE with consideration being given to delay constraints, with the delay constraints being considered at a different time from other constraints. Operations 600 may be indicative of operations occurring in a TE controller, such as TE controller 120, as the TE controller performs TE with consideration being given to delay constraints, with the delay constraints being considered at a different time from other constraints.

Operations 600 may begin with the TE controller determining a set of candidate paths for traffic flows upon which it is performing TE (block 605). In general, the set of candidate paths may include all paths between a source and a destination for each traffic flow. In practice, the set of candidate paths may include paths that are shorter than a specified number of hops, paths that do not include links that are over loaded, and the like. The TE controller may perform TE on the set of candidate paths (block 610). The TE performed on the set of candidate paths may consider constraints such as flow demand constraints, wireline link capacity constraints, wireless link resource capacity constraints, and the like, without consideration being given to delay constraints. The TE controller may produce path solutions for the traffic flows.

The TE controller may store the path solutions (block 615). The path solutions may be stored in a memory (local or remote), a database (local or remote), and so on. The TE controller may perform a check to determine if completion criterion has been met (block 620). The completion criterion may specify a termination point for the TE controller. The completion criterion may be applied to each of the path solutions separately. In other words, the path solutions may be evaluated independently. Examples of completion criterion may include the path solution satisfying a delay constraint of the traffic flow associated with the path solution, the TE controller may have performed a maximum number of TE iterations upon the traffic flow, and the like.

If the completion criterion has been met, the TE controller may select the path solution from storage (block 625). The TE controller may provide information about the path solutions (block 630). The TE controller may send information about the path solutions to nodes in the communications system. As an illustrative example, if on a first iteration of operations 600, the TE controller is able to find a path solution that meets the completion criterion, the TE controller may then select the path solution and send out information about the path solution. As another illustrative example, if the TE controller performs 10 iterations prior to the completion criterion being met, the TE controller may select the path solution that best meets a solution selecting criterion. For example, the solution selecting criterion may be a minimum number of delay constraints violated, a maximum number of delay constraints met, a minimum overall delay, minimized delay for all traffic flows, minimized delay for traffic flows with paths included in the path solutions, and the like (if the completion criterion being met is the maximum number of TE iterations), or the path solution resulted in the completion criterion being met (if the completion criterion being met is satisfying the delay constraint) and send out information about the path solution. Operations 600 may terminate.

If the completion criterion has not been met, the TE controller may exclude the one or more paths associated with the path solution produced in block 610 from the set of candidate paths (block 635). The one or more paths being excluded may be referred to as bottle-neck path(s) and may be the path(s) that violate delay constraints. The TE controller may also update the set of candidate paths. The TE controller may return to block 610 to perform TE on the set of candidate paths.

Figure 7:
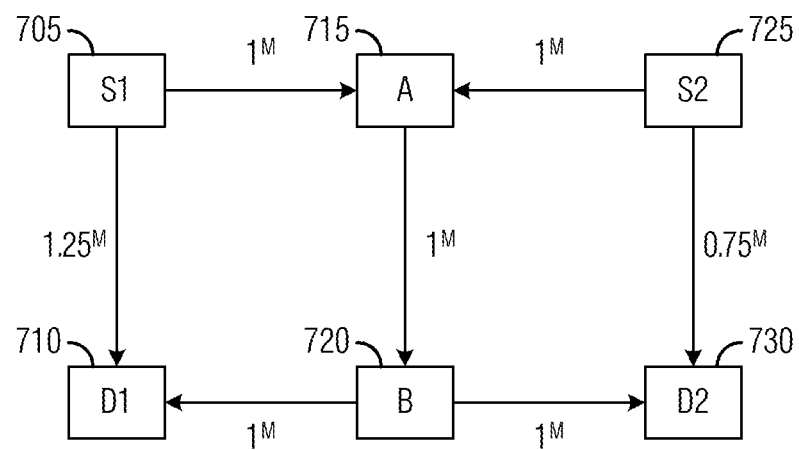
FIG. 7 illustrates a portion of an example communications system highlighting example TE with consideration being given to delay constraints according to example embodiments described herein.

FIG. 7 illustrates a portion of an example communications system 700 highlighting example TE with consideration being given to delay constraints. Communications system 700 is presented to discuss the operation of operations 600. For discussion purposes, consider two traffic flows:

flow_1—Node S1 705 to Node D1 710 with two candidate paths:
path_1 Node S1 705 to Node D1 710, and
path_2 Node S1 705 to Node A 715 to Node B 720 to Node D1 710; and flow_2—Node S2 725 to Node D2 730 with two candidate paths:
path_1 Node S2 725 to Node D2 730, and
path_2 Node S2 725 to Node A 715 to Node B 720 to Node D2 730.

Links between nodes have different bandwidths (shown numerically in FIG. 7). Both traffic flows have the following characteristics and/or requirements:

1 Mbps of bandwidth each;
flow_1 demands 100 ms packet delay;
flow_2 demands 1 s packet delay; and
100 Kbit packet size.

In a first iteration where TE is performed with Weighted Max Min (WWM) objective, the two paths of flow_1 may be allocated 0.833 Mbps and 0.167 Mbps, respectively, while the two paths of flow_2 may be allocated 0.5 Mbps and 0.5 Mbps. Flow_1 may have packet delays of 80 ms and 300 ms for its two paths, while flow_2 may have packet delays of 133 ms and 300 ms for its two paths. Path_2 of flow_1 fails the packet delay constraint, while the other paths satisfy the packet delay constraints.

In a second iteration, some of the paths may be updated and/or eliminated, the two traffic flows may have the following paths:

flow_1—Node S1 705 to Node D1 710 with two candidate paths:
path_1 Node S1 705 to Node D1 710; and flow_2—Node S2 725 to Node D2 730 with two candidate paths:
  path_1 Node S2 725 to Node D2 730, and
  path_2 Node S2 725 to Node A 715 to Node B 720 to Node D2 730.

Both traffic flows have the same characteristics and/or requirements listed above. After performing TE, flow_1 is carried on path_1 with an allocation of 1 Mbps, while flow_2 is allocated 0.6 Mbps and 0.4 Mbps for path_1 and path_2, respectively. Flow_1 may have a packet delay of 80 ms, while flow_2 has packet delays of 133 ms and 300 ms for its two flows. All paths now meet the packet delay constraint.

According to an example embodiment, a closed-loop TE process is presented. In the closed-loop TE process, actual path delay measurements may be used to improve packet delay estimates. The actual path delay measurements may be applicable to both prior art TE processes, as well as the example embodiments presented herein. As an illustrative example, the estimated path delays may be adjusted based on the actual path delay measurements. The adjustments may be in the form of adding some constant value to the estimated delay or multiplying the estimated delay by a constant, and the like. If the path delay constraint is expressible as $f(x)<D$, and the actual delay is d at allocation $x^0$, then the adjusted path delay constraint is expressible as $f(x)-f(x^0)+d<D$. This compensates for the error in the estimated delay. Alternatively, the actual path delays may be used in place of the estimated path delays in the TE processes.

Figure 8:
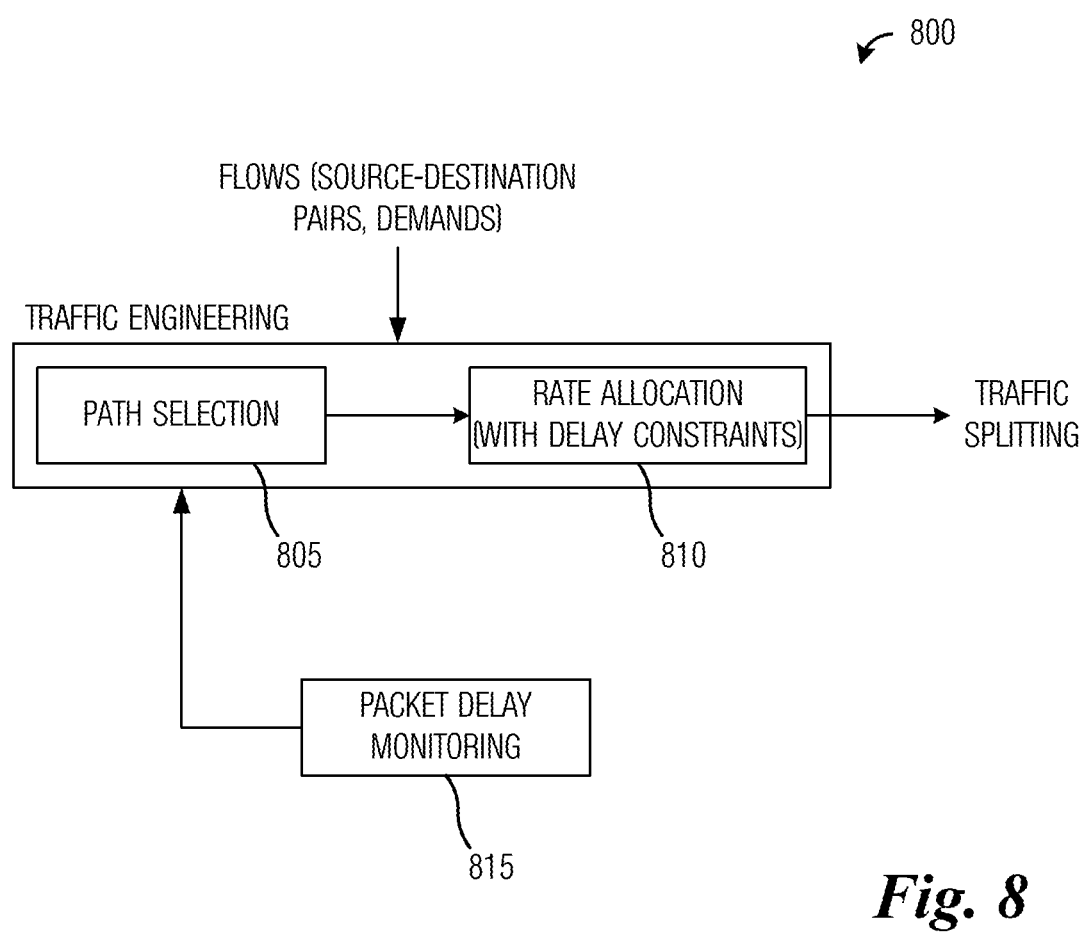
FIG. 8 illustrates an example closed-loop TE controller according to example embodiments described herein.

FIG. 8 illustrates an example closed-loop TE controller 800. Closed-loop TE controller 800 includes a path selection unit 805 configured to select path solutions for traffic flows. Closed-loop TE controller 800 also includes a rate allocation unit 810 configured to allocate packet rates for paths of the one or more paths for each traffic flow, i.e., each path solution of each traffic flow. Closed-loop TE controller 800 further includes a packet delay monitoring unit 815 configured to measure actual path delays. The measured path delays may be used by path selection unit 805 and rate allocation unit 810 to select path solutions and allocate packet rates.

Figure 9A:
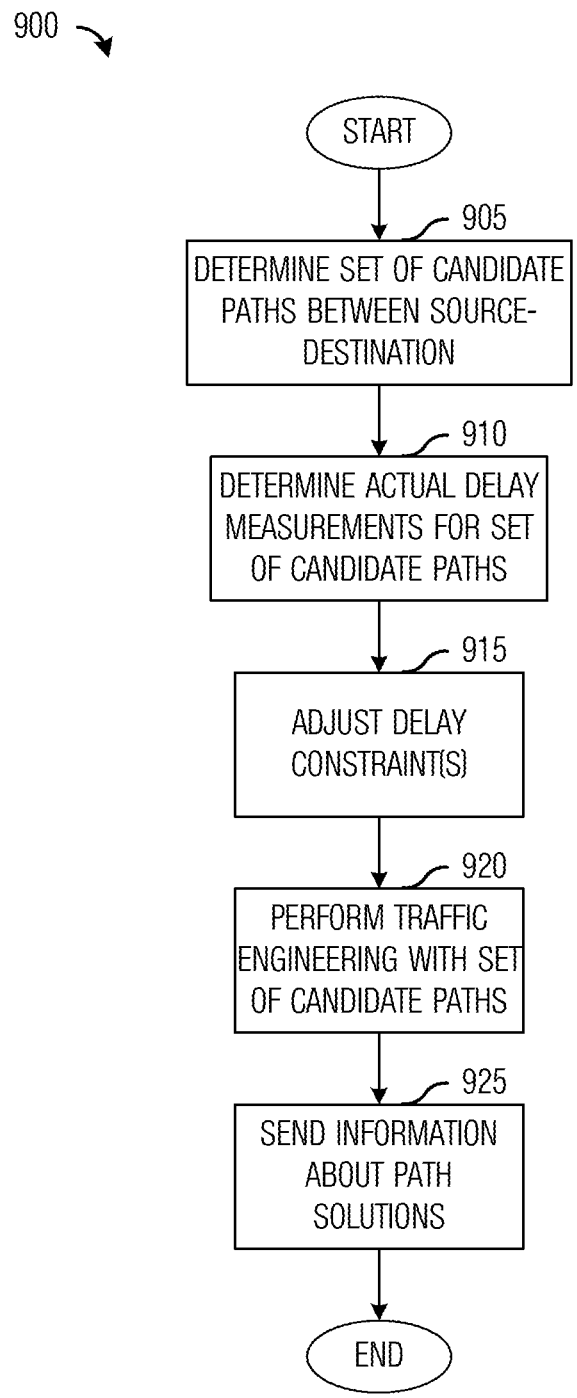
FIG. 9a illustrates a flow diagram of example operations occurring in a TE controller as the TE controller performs TE with consideration being given to delay constraints, where the TE controller uses actual path delay measurements to adjust delay constraints according to example embodiments described herein.

FIG. 9*a* illustrates a flow diagram of example operations 900 occurring in a TE controller as the TE controller performs TE with consideration being given to delay constraints, where the TE controller uses actual path delay measurements to adjust delay constraints. Operations 900 may be indicative of operations occurring in a TE controller, such as TE controller 120, as the TE controller performs TE with consideration being given to delay constraints.

Operations 900 may begin with the TE controller determining sets of candidate paths for traffic flows upon which it is performing TE (block 905). The TE controller may determine actual delay measurements for the paths in the sets of candidate paths (block 910). The TE controller may make the measurements. The TE controller may receive measurements from nodes in the communications system. The TE controller may use historical information. The TE controller may adjust delay constraints using the actual delay measurements (block 915). The TE may perform TE using the adjusted delay constraints (block 920). The TE controller may utilize TE techniques, such as those described in FIGS. 5 and 6, for example. The TE controller may provide information about the path solutions (block 925).

Figure 9B:
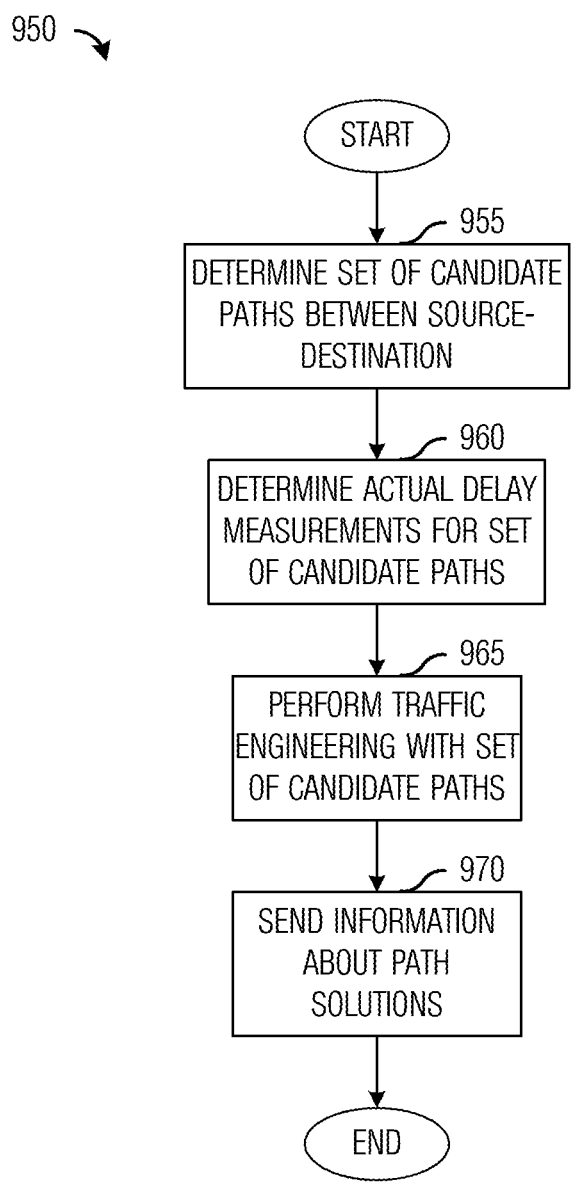
FIG. 9b illustrates a flow diagram of example operations occurring in a TE controller as the TE controller performs TE with consideration being given to delay constraints, where the TE controller uses actual path delay measurements in place of delay constraints according to example embodiments described herein.

FIG. 9*b* illustrates a flow diagram of example operations 950 occurring in a TE controller as the TE controller performs TE with consideration being given to delay constraints, where the TE controller uses actual path delay measurements in place of delay constraints. Operations 950 may be indicative of operations occurring in a TE controller, such as TE controller 120, as the TE controller performs TE with consideration being given to delay constraints.

Operations 950 may begin with the TE controller determining sets of candidate paths for traffic flows upon which it is performing TE (block 955). The TE controller may determine actual delay measurements for the paths in the sets of candidate paths (block 960). The TE may perform TE using the actual delay measurements as the delay constraints (block 965). The TE controller may utilize TE techniques, such as those described in FIGS. 5 and 6, for example. The TE controller may provide information about the path solutions (block 970).

In an alternate embodiment, a TE controller obtains the required data for a TE problem, including data about traffic flows across a network segment, as well as a set of constraints including delay constraints. The TE controller identifies, in the set of constraints, a subset of the constraints that are non-convex in nature, and then reframes the TE problem using the complement of the identified set of non-convex constraints, i.e., a set of convex constraints. The solution to this reframed problem will satisfy the convex constraints. Upon obtaining the solution to the reframed TE problem, the controller can then evaluate the solution against each of the non-convex constraint in the identified set of constraints. If the controller determines that the solution satisfies each of the non-convex constraints, the TE problem is considered solved as it will satisfy both convex and non-convex constraints, and nodes are forwarded TE instructions in accordance with the determined TE solution.

If the TE solution does not satisfy the non-convex constraints, the TE controller identifies a path associated with one of the non-convex constraints (in one embodiment, preferably a constraint that was not satisfied), removes the path from consideration and obtains a new TE solution. The new solution is checked to see if it satisfies the non-convex constraints. If the non-convex constraints are satisfied, the TE problem is considered solved, and the process continues as described above. If the non-convex constraints are not satisfied, a different path is removed (possibly with the earlier removed path re-entered) and the process continues. This iteration through the removal of paths can be continued until any one of the following conditions are satisfied: a solution to the TE problem is reached that satisfies all the constraints, all possible combinations of removable paths have been evaluated, or a predetermined number of iterations has been performed. When a TE solution is found to not satisfy all the non-convex constraints, performance characteristics of the solution (alternatively a solution selection criterion) can be stored. If either all the combinations have been evaluated or the predetermined number of iterations has been performed without finding a TE solution that satisfies all the non-convex constraints, one of the solutions found is selected in accordance with the evaluation of the solutions against the solution selection criteria can be selected, and TE instructions can be forwarded to the nodes in accordance with the determined TE solution. Examples of the solution criterion include minimum number of delay constraints violated, a maximum number of delay constraints met, a minimum overall delay, minimized delay for all traffic flows, minimized delay for traffic flows with paths included in the path solutions, and the like.

Figure 10:
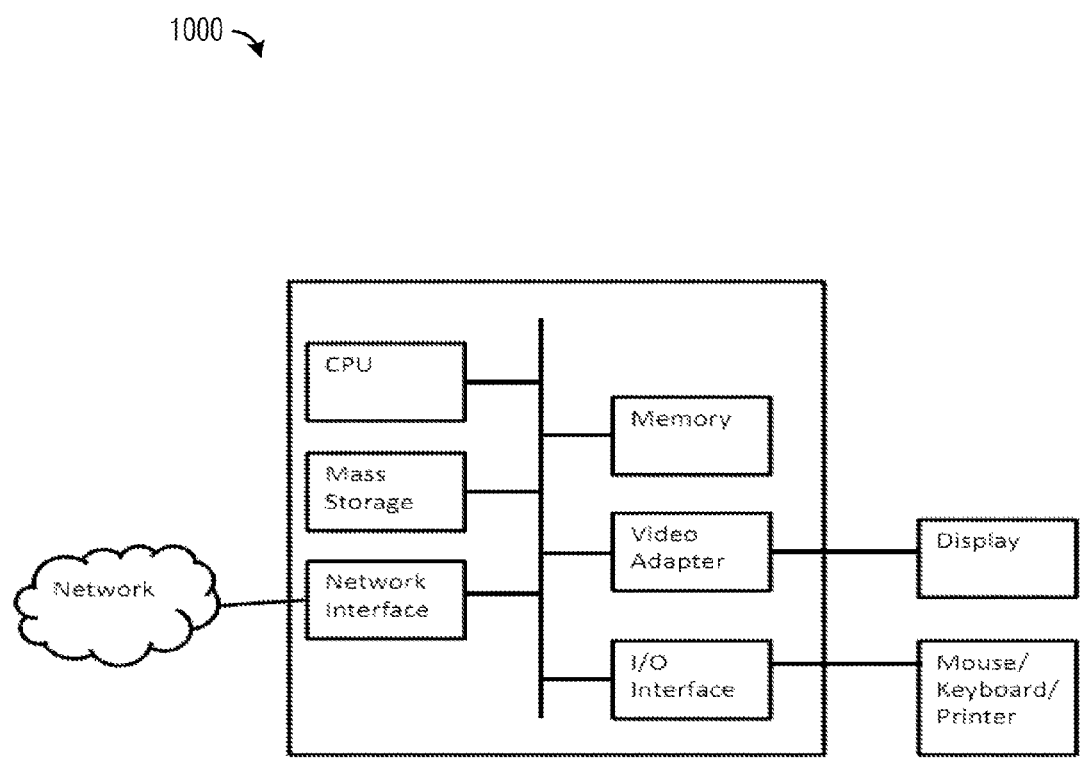
FIG. 10 illustrates a block diagram of an example processing system that may be used for implementing the devices and methods disclosed herein.

FIG. 10 illustrates a block diagram of an example processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 11:
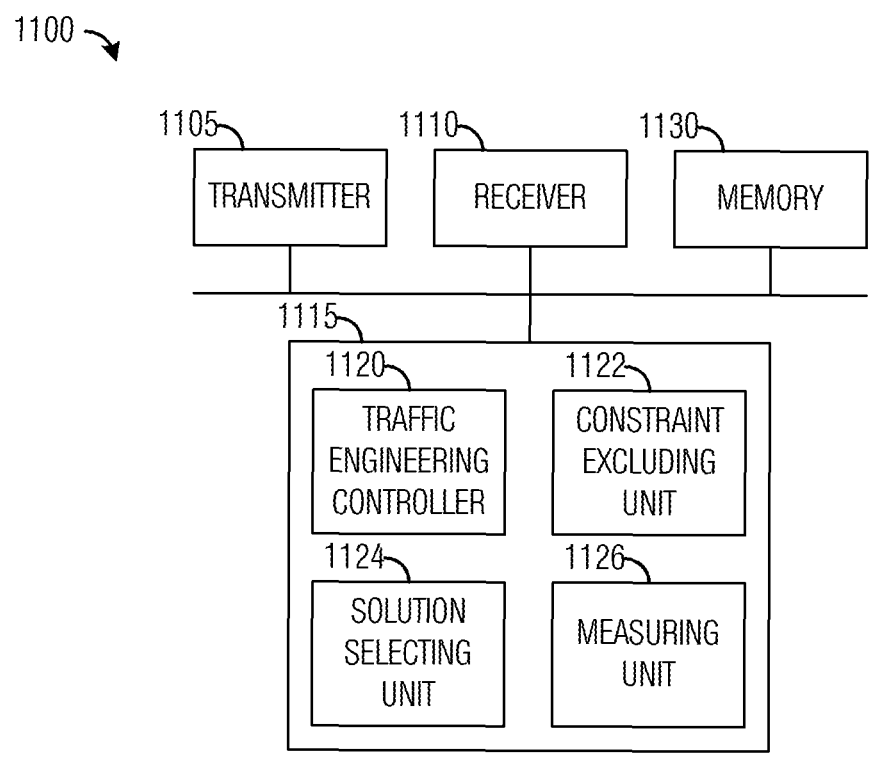
FIG. 11 illustrates an example communications device according to example embodiments described herein.

FIG. 11 illustrates an example communications device 1100. Communications device 1100 may be an implementation of a TE controller. Communications device 1100 may be used to implement various ones of the embodiments discussed herein. As shown in FIG. 11, a transmitter 1105 is configured to transmit information about path solutions, and the like. Communications device 1100 also includes a receiver 1110 that is configured to receive constraints, delay measurements, completion criteria, and the like.

A TE controller 1120 is configured to perform TE on a set of candidate paths for a traffic flow while considering constraints, such as delay constraints, flow demand constraints, wireline link capacity constraints, wireless link resource capacity constraints, and the like. A constraint excluding unit 1122 is configured to exclude non-convex constraints from a set of potential delay constraints. Constraint excluding unit 1122 is configured to exclude bottleneck paths as well as associated constraints. A solution selecting unit 1124 is configured to select a path solution from a plurality of path solutions. Solution selecting unit 1124 is configured to select a path solution that best meets a solution selecting criterion. Examples of the solution criterion may include be a minimum number of delay constraints violated, a maximum number of delay constraints met, a minimum overall delay, minimized delay for all traffic flows, minimized delay for traffic flows with paths included in the path solutions, and the like. A measuring unit 1126 is configured to measure packet delays. A memory 1130 is configured to store sets of candidate paths, sets of path delay constraints, sets of convex constraints, constraints, traffic flows, delay measurements, and the like.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while traffic engineering controller 1120, constraint excluding unit 1122, solution selecting unit 1124, and measuring unit 1126 may be software modules executing in a microprocessor (such as processor 1115) or a custom circuit or a custom compiled logic array of a field programmable logic array. Traffic engineering controller 1120, constraint excluding unit 1122, solution selecting unit 1124, and measuring unit 1126 may be modules stored in memory 1130.

Although the present disclosure and its advantages have been described in detail, it should be understood that various changes, substitutions and alterations can be made herein without departing from the spirit and scope of the disclosure as defined by the appended claims.

What is claimed is:

1. A method for engineering traffic in a communications system, the method comprising:
   determining, by a traffic engineering (TE) controller, a set of delay constraints associated with a traffic flow over the communications system;
   excluding, by the TE controller, non-convex constraints from the set of delay constraints, thereby producing a set of convex constraints, wherein the set of convex constraints are the complement of the non-convex constraints;
   selecting, by the TE controller, a first path solution for the traffic flow in accordance with the set of convex constraints; and
   sending, by the TE controller, information regarding the first path solution to nodes in the communications system.

2. The method of claim 1, wherein the first path solution is selected in accordance with the set of convex constraints, a set of link capacity constraints associated with the communications system, and a set of flow demand constraints associated with the traffic flow.

3. The method of claim 1, wherein the first path solution comprises at least one path from a source node to a destination node associated with the traffic flow.

4. The method of claim 3, wherein the first path solution further comprises a bandwidth allocation for the at least one path.

5. The method of claim 1, wherein selecting the first path solution comprises:
selecting the first path solution in accordance with a solution selecting criterion.

6. The method of claim 5, wherein the solution selecting criterion comprises one of a minimum number of delay constraints violated, a maximum number of delay constraints met, a minimum overall delay, minimized delay for all traffic flows, and minimized delay for traffic flows with paths included in the first path solution.

7. The method of claim 1 further comprising:
selecting a second path solution in accordance with at least one of the non-convex constraints.

8. The method of claim 1, further comprising:
measuring an actual packet delay for the first path solution; and
adjusting the set of delay constraints in accordance with the actual packet delay, thereby producing an adjusted set of delay constraints.

9. The method of claim 8, wherein selecting the first path solution comprises selecting the first path solution in accordance with the adjusted set of delay constraints.

10. The method of claim 1, further comprising:
measuring an actual packet delay for the first path solution, wherein selecting the first path solution comprises selecting the first path solution for the traffic flow in accordance with the actual packet delay.

11. The method of claim 1, wherein sending the information regarding the first path solution comprises sending the information to routers in the communications system.

12. A method for engineering traffic in a communications system, the method comprising:
determining, by a traffic engineering (TE) controller, a set of candidate paths for carrying a traffic flow over the communications system and a set of link capacity constraints for the communications system, wherein the traffic flow has an associated set of flow demand constraints;
selecting, by the TE controller, a path solution for the traffic flow out of the set of candidate paths in accordance with the set of flow demand constraints, and the set of link capacity constraints;
storing, by the TE controller, the path solution;
determining, by the TE controller, whether a completion criterion is met; and
sending, by the TE controller, information regarding the stored path solution to nodes in the communications system when the completion criterion is met.

13. The method of claim 12, further comprising after storing the path solution:
when the completion criterion is not met,
eliminating at least one path exceeding a delay constraint from a set of delay constraints of the traffic flow from the set of candidate paths, and
selecting a new path solution for the traffic flow out of the set of candidate paths in accordance with the set of flow demand constraints and the set of link capacity constraints, prior to determining whether the completion criterion is met.

14. The method of claim 13, wherein the completion criterion is met when the number of times at least one path solution has been selected an stored for the traffic flow is greater than a specified threshold, and the method further comprises:
when the completion criterion is met,
choosing one of the stored at least one path solution in accordance with a solution selection criterion, and
sending information regarding the chosen path solution to the nodes in the communications system.

15. The method of claim 14, wherein the solution selection criterion comprises one of a minimum number of delay constraints violated, a maximum number of delay constraints met, a minimum overall delay, minimized delay for all traffic flows, and minimized delay for traffic flows with paths included in the at least one path solution.

16. The method of claim 12, wherein the completion criterion comprises if the path solution meets a set of delay constraints of the traffic flow.

17. The method of claim 12, further comprising:
measuring an actual packet delay for the path solution, wherein the completion criterion comprises at least one of if the path solution meets the actual packet delay of the traffic flow and if a number of times at least one path solution has been selected for the traffic flow meets a specified threshold.

18. The method of claim 12, wherein the path solution comprises at least one path from a source node to a destination node associated with traffic flow.

19. A traffic engineering (TE) controller of a communications system, the TE controller comprising:
a processor configured to determine a set of delay constraints associated with a traffic flow over the communications system, to exclude non-convex constraints from the set of delay constraints, thereby producing a set of convex constraints, and to select a path solution for the traffic flow in accordance with the set of convex constraints, wherein the set of convex constraints are the complement of the non-convex constraints; and
a transmitter operatively coupled to the processor, the transmitter configured to send information regarding the path solution to nodes in the communications system.

20. The TE controller of claim 19, wherein the processor is configured to select the path solution in accordance with a solution selecting criterion.

21. The TE controller of claim 20, wherein the solution selecting criterion comprises one of a minimum number of delay constraints violated, a maximum number of delay constraints met, a minimum overall delay, minimized delay for all traffic flows, and minimized delay for traffic flows with paths included in the path solution.

22. The TE controller of claim 19, wherein the transmitter is configured to send the information to routers in the communications system.

23. The TE controller of claim 19, wherein the processor is configured to measure an actual packet delay for the path solution, and to adjust the set of delay constraints in accordance with the actual packet delay, thereby producing an adjusted set of delay constraints.

24. The TE controller of claim 19, wherein the processor is configured to measure an actual packet delay for the path solution, and to select the path solution for the traffic flow in accordance with the actual packet delay.

25. A traffic engineering (TE) controller of a communications system, the TE controller comprising:
a processor configured to determine a set of candidate paths for carrying a traffic flow over the communications system and a set of link capacity constraints for the communications system, wherein the traffic flow has an associated set of flow demand constraints, to select a path solution for the traffic flow out of the set of candidate paths in accordance with the set of flow demand constraints, and the set of link capacity constraints, to store the path solution, and to determine whether a completion criterion is met; and a transmitter operatively coupled to the processor, the transmitter configured to send information regarding the stored path solution to nodes in the communications system when the completion criterion is met.

26. The TE controller of claim 25, wherein the processor is configured to, when the completion criterion is not met, eliminate at least one path exceeding a delay constraint of the traffic flow from the set of candidate paths, and select a new path solution for the traffic flow out of the set of candidate paths in accordance with the set of flow demand constraints and the set of link capacity constraints, prior to determining whether the completion criterion is met.

27. The TE controller of claim 26, wherein the completion criterion is met when the number of times at least one path solution has been selected and stored for the traffic flow is greater than a specified threshold, and wherein the processor is configured, when the completion criterion is met, to choose one of the stored at least one path solution in accordance with a solution selection criterion, and send information regarding the chosen path solution to the nodes in the communications system.

28. The TE controller of claim 25, wherein the processor is configured to measure an actual packet delay for the path solution, wherein the completion criterion comprises at least one of if the path solution meets the actual packet delay of the traffic flow and if a number of times at least one path solution has been selected for the traffic flow meets a specified threshold.

* * * * *

UNITED STATES PATENT AND TRADEMARK OFFICE
CERTIFICATE OF CORRECTION

PATENT NO. : 9,722,913 B2  Page 1 of 1
APPLICATION NO. : 14/533797
DATED : August 1, 2017
INVENTOR(S) : Hamidreza Farmanbar It is certified that error appears in the above-identified patent and that said Letters Patent is hereby corrected as shown below:

In the Claims

In Column 13, Line 62, Claim 14, delete "selected an stored for" and insert --selected and stored for--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*